United States Patent [19]

Atalar et al.

[11] Patent Number: 4,645,937

[45] Date of Patent: Feb. 24, 1987

[54] METHOD AND APPARATUS FOR DETECTING THE DISTANCE BETWEEN AN OBJECT AND AN ULTRASONIC OBJECTIVE

[75] Inventors: Abdullah Atalar, Ankara, Turkey; Herbert Fischbach, Nauborn; Dieter Huelsmann, Solms, both of Fed. Rep. of Germany

[73] Assignee: Ernst Leitz Wetzlar GmbH, Wetzlar, Fed. Rep. of Germany

[21] Appl. No.: 670,914

[22] Filed: Nov. 13, 1984

[30] Foreign Application Priority Data

Nov. 10, 1983 [DE] Fed. Rep. of Germany ....... 3340646

[51] Int. Cl.$^4$ ................................................. G01V 9/04
[52] U.S. Cl. ........................................ 250/561; 73/624
[58] Field of Search ..................... 250/201, 216, 222.1, 250/561; 73/614, 622, 624

[56] References Cited

U.S. PATENT DOCUMENTS 4,356,392 10/1982 Wittekoek .......................... 250/201

*Primary Examiner*—Gene Wan
*Attorney, Agent, or Firm*—Schwartz, Jeffery, Schwaab, Mack, Blumenthal & Evans

[57] ABSTRACT

Method and apparatus for detecting the distance between an ultrasonic objective and an object to be imaged in order to prevent contact between the two. For this purpose, light rays, after entering into an immersion means (water) between the objective and the object, being reflected by the object, and emanating from the immersion means are fed through the ultrasonic objective to a photo-receiver and converted into electric signals. The front face of the lens body of the ultrasonic objective is provided with an opaque ring zone. This arrangement makes it possible simultaneously to illuminate the object.

8 Claims, 3 Drawing Figures

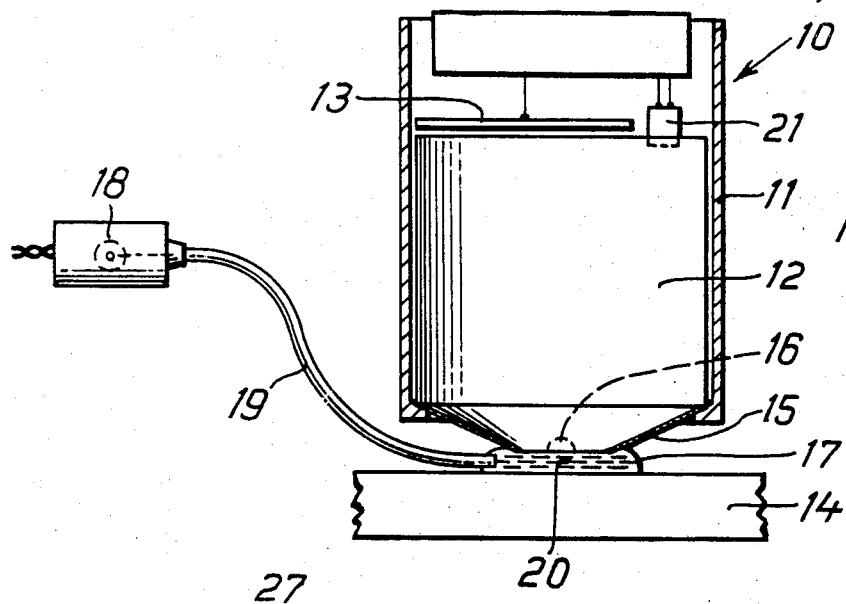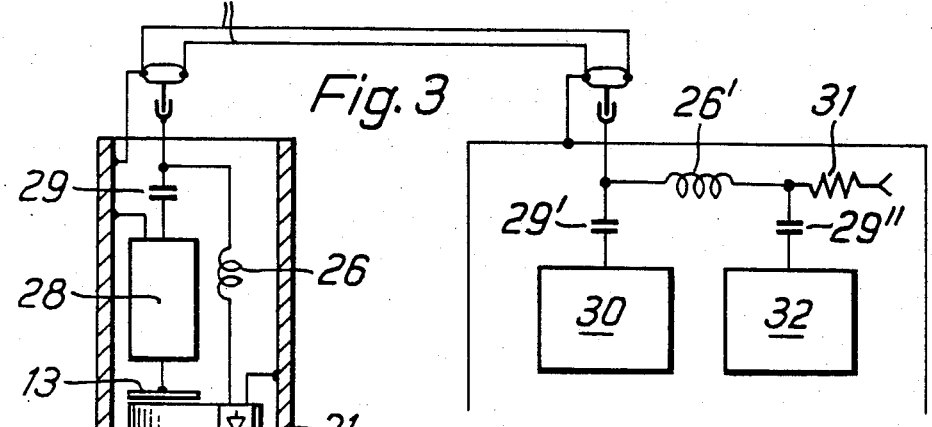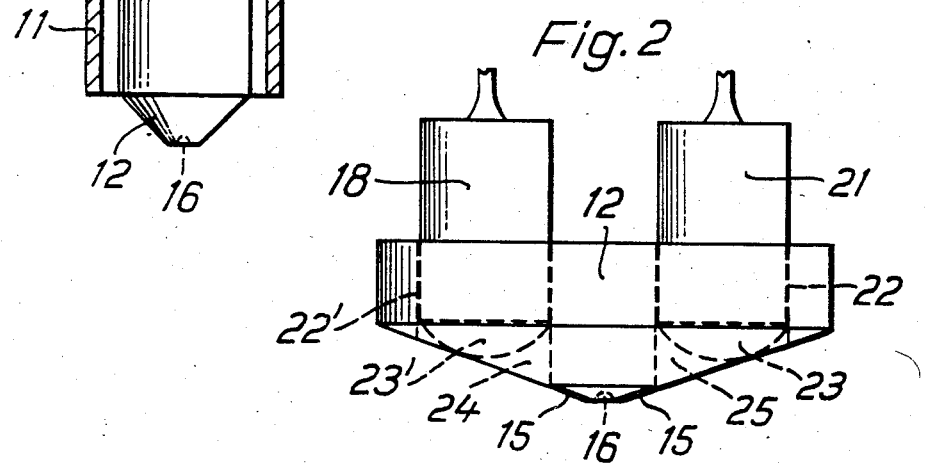

METHOD AND APPARATUS FOR DETECTING THE DISTANCE BETWEEN AN OBJECT AND AN ULTRASONIC OBJECTIVE

BACKGROUND OF THE INVENTION

The invention relates to a method for detecting the distance between an object and an ultrasonic objective which can be moved relative to each other, and to an arrangement for carrying out the method.

U.S. Pat. No. 4,356,392 discloses an optical imaging system having an opto-electronic detection arrangement for determining a deviation between the image plane of the imaging system and a second plane in which an image is produced. The detection arrangement has a radiation source which generates an auxiliary beam and a reflection element in the radiation path of the auxiliary beam which is reflected a first time and redirected to the second plane by means of the reflection element. Two detectors in the radiation path of the auxiliary radiation beam, which is reflected twice at the second plane, are connected to the imaging system, and the difference between the output signals of the two detectors represents a measure of the deviation in distance. This familiar arrangement requires transmission elements, which are coupled to the imaging system, in the form of two additional lens systems and reflection elements and is not intended, nor is it suitable, for detecting the distance between an object and an ultrasonic objective which can be moved relative to each other.

When working with an acoustical microscope, in which working distances are of the order of magnitude of about 30 microns, reproducible focussing of the ultrasonic objective is possible to an accuracy of better than 0.1 microns by mechanically adjusting the microscope gauge as disclosed in Leitz-Mitt. Wiss. u. Techn., Vol. VIII, No. 3/4, p.65, Wetzlar, May 1982. The arrangement shown in this publication consists of an acoustical microscope and an optical microscope which are mounted on a common support and are aligned with each other in such a manner that object details selected or identified with the optical microscope can be retrieved with only very little deviation in the acoustical microscope image. The actual final focussing on the object surface for generating the ultrasonic image is carried out by observing the contrast of the acoustical image which changes considerably within the focussing range even with a change of approximately 0.1–0.2 microns, that is, less than one quarter of the wavelength of sound in the water coupling medium. Since the front face of the lens body of the ultrasonic objective is then moved in a raster scanning pattern over the object surface at the above-mentioned working distance in two directions which are perpendicular to each other, any contact with the object will lead to contamination or even damage of the ultrasonic objective and/or of the object and thus to an operational failure of the device.

Since examinations with the acoustical microscope are also frequently carried out in a darkened room, the risks mentioned above are also incurred to the same extent even during adjustment work.

SUMMARY OF THE INVENTION

The invention has the basic aim of creating a method of the type initially mentioned which prevents any contact between an object and an ultrasonic objective, independently of ambient illumination, does not require any elaborate preliminary work and, in addition, works continuously and with high sensitivity even with raster scanning of the object while making extensive use of existing components. Corresponding to a further aim of the invention, an arrangement is specified by means of which a distance detection process can be carried out which is independent of the high-frequency apparatus for generating and transferring microwaves to the piezo-electric transducer and of the latter itself, without coupling additional optical components to the ultrasonic objective.

These objects are obtained according to one aspect of the present invention by carrying out a method comprising the steps of (a) reflecting light from the surface of the object; (b) transmitting the reflected light past the ultrasonic objective only when the distance between the object and objective is greater than a predetermined distance; (c) converting the reflected and transmitted light into an electric signal having a level indicative of the intensity of said reflected and transmitted light; and (d) generating an indication when said level of said electric signal falls below a predetermined threshold.

This method is carried out advantageously on apparatus also disclosed herein, comprising a lens body, an ultrasonic objective within the lens body and dimensioned to substantially block the passage of light reflected into the lens body by the object surface when the distance between the object and objective is less than a predetermined distance, and to permit passage of the reflected light when the distance is not less than the predetermined distance; and means, arranged to receive said reflected light permitted to pass said ultrasonic objective, for generating a signal indicative of intensity of the received light.

As used herein, "reflected" generally means reflected or scattered by the object and transmitted through the immersion means.

BRIEF DESCRIPTION OF THE DRAWINGS

Further details of the invention will be found in the subsequent description of two typical embodiments diagrammatically shown in the drawing, in which:

FIG. 1 is a simplified sectional view of a first embodiment of an arrangement conforming to the invention;

FIG. 2 is a second embodiment in a simplified sectional view; and

FIG. 3 is a block diagram for a distance detection system conforming to the typical embodiment of FIG. 1.

DETAILED DESCRIPTION OF THE PREFERRED EMBODIMENTS

In the method according to the invention, light rays, which have entered the immersion means, are impinged on the object and have emanated from the latter and from the immersion means, are caused to be fed to the ultrasonic objective and then continuously detected so that if the distance between the object and the ultrasonic objective drops below a minimum, the light rays are in effect converted into a signal for the purpose of generating a warning, or for regulating and/or stopping relative motion of the object and objective. In this manner, the utrasonic objective, comprising the transparent lens body and the distance measuring device, form a unit which operates without contacting the object and which, as a receiving device, indicates any impending contact with the object surface or prevents such a contact by interrupting the scanning motion.

In a device for carrying out the method, the surface of the object may be illuminated by ambient light, or with light from a light source emitting specified wavelengths. At least one photo-receiver is preferably disposed inside the ultrasonic objective formed of a lens body, and mounted in a holder, for the detection of the light rays emanating from the object and the immersion means. A piezo-electric transducer is connected to the holder and functions as a transmitter and receiver of acoustical signals. The front face of the lens body is further provided with an opaque ring zone.

These elements are arranged so that, when the ultrasonic objective approaches the object surface, natural ambient light, or light generated by a light source and directed onto the object, can reach the interior of the lens body and the photo-receiver only via a gap resulting from the intermediate space between the lens front and the object surface. It has been found that such an arrangement makes it possible to provide an extremely sensitive distance detection with the smallest working distances, the water used as a coupling medium between the lens front face and the object additionally reducing optical losses. Interference with the high-frequency section or the piezo-electric transducer by the low-frequency signals of the photo-receiver can be eliminated by simple circuit measures which are themselves known. "At least one photo-receiver" or "photo-receiver" in this case means not only a single photo-receiver, but also any form of means for detecting light, multiple or single in the wider sense, which can be disposed within the ultrasonic objective.

In an advantageous further aspect of the invention, the light source can be disposed outside the ultrasonic objective, and the photo-receiver on the lens body side opposite to the objective, and an optical waveguide can be provided for transmitting the light. A suitable light source in this context would be light-emitting diodes which are operated with alternating current or pulsed direct current. This makes it possible to work independently of room illumination and creates illumination of the object for examinations carried out in a darkened room if light-emitting diodes and corresponding receivers operating in the visible range are used.

For some purposes, the arrangement can be advantageously made in such a manner that both the light source and the photo-receiver are provided inside the lens body. No optical waiveguide is required in this embodiment, which makes particularly efficient use of space.

It is also conceivable to construct the holder for the lens body side facing away from the object, in the vicinity of the piezo-electric transducer.

The object signals received by the piezo-electric transducer at the back of the lens body and the high-frequency signals passed on via amplifier stages are applied together with the low-frequency output of the photo-receiver adjacent to the piezo-electric transducer, via a coaxial line to an electric circuit. This circuit essentially consists of a frequency filter formed of capacitors and inductances, the capacitors being dimensioned to transmit only high frequencies while the inductances act to block the high frequency but have a low resistance with respect to the low frequency of the photo-receiver, so that the inductances pass on the photo-receiver's signal.

In the embodiment of FIG. 1, an ultasonic objective 10 is shown which essentially consists of a lens body 12 which is mounted in the holder 11 and on the upper, level face of which a piezo-electric transducer 13 is arranged. The lower face of the lens body 12, facing an object 14, is formed by a conical opaque ring zone 15 having a central, spherical skullcap-shaped element or calotte 16. Between the object 14 and the ring zone 15 incorporating the calotte 16, a liquid coupling medium 17 (water) is located, the latter, in conjunction with the calotte 16, forming the actual ultrasonic lens. For illuminating the object 14, a light source 18 and an optical waveguide 19 are disposed adjacent to the ultrasonic objective 10. In this arrangement, a light-emitting diode operated with alternating current or pulsed direct current is used as a light source which enables the illuminating arrangement to work independently of room illumination. The light reflected from the object 14 and passing through the immersion means 17 then reaches the lens body 12 only via a gap 20 resulting from the intermediate space between the lens front and the object surface, and from the lens body passes to a photo-receiver 21 which is disposed adjacent to the piezo-electric transducer 13 on the side facing away from the object 14 of the lens body 12. In this arrangement, the water coupling medium 17 is utilized not only as an additional medium for conducting light to the lens body 12, but it also prevents optical losses. Elements comprising a control unit 8 indicated as a functional block in FIG. 1 will be described below.

The embodiment of FIG. 2 differs from that of FIG. 1 in that both the light source 18 and the photo-receiver 21 have been shifted into the interior of the lens body 12. For this purpose, the latter has two holes 22, 22' the lower end of which is formed by one lens 23,23' each. The opaque ring zone 15 here immediately joins the calotte 16. The light emitted by the light source 18 passes through a circular light exit opening 24 to the object 14 and the component reflected and/or scattered by the latter impinges on the photo-receiver 21 via a light entrance opening 25.

FIG. 3 shows detail of control unit 8 depicted functionally in FIG. 1.

Inside the holder 11 of the lens body 12, the piezo-electric transducer 13 and the photo-receiver 21 are disposed on the lens body side opposite to the object 14. The light from the object 14 passes through the gap 20 and impinges on the photo-receiver 21 which, at its output, feeds low-frequency signals via an inductance 26 into a coaxial line 27. On the other hand, the latter carries the high-frequency signals received from the piezo-electric transducer 13 and emits them via a matching network 28 and following capacitor 29. These high-frequency signals are supplied via another capacitor 29' to a high-frequency transmitter/receiver 30, while the low-frequency filter passes on the operating voltage for the photo-receiver 21 via a second inductance 26'. The signal voltage for the distance detection system then forms across a load resistance 31 and is fed via a capacitor 29" to a low-frequency amplifier 32. As has already been mentioned, in the present circuit arrangement the capacitors 29,29' and the inductance 26,26' form a frequency filter in which the capacitors 29,29' are designed in such a manner that they transfer only high frequency signals while, conversely, the inductances 26,26' act as a high-frequency trap but have only a low resistance with respect to the low frequency signals.

The control unit 8 operates to carry out the method of the invention in a fashion which will be apparent to one of ordinary skill in the art. As long as gap 20 is wide enough to admit at least a predetermined amount of reflected light to photoreceiver 21, the voltage signal occurring across resistor 31 will be greater than a predetermined threshold amount. If the ultrasonic objective approaches too closely to the object, however, the light from light source 18 will be occluded, and the amount of light reaching photo-receiver 21 will be less than the predetermined amount. This will cause the voltage signal to fall below its predetermined threshold amount, a condition which may be detected and used to cause a predetermined response such as an alarm or automatic motion control, in a fashion which will be apparent to one of ordinary skill in the art.

What is claimed is:

1. A method of detecting a distance between a surface of an object and an ultrasonic objective so as to prevent mutual contact comprising the steps of:
    (a) reflecting light from said surface;
    (b) permitting transmission of said reflected light past said ultrasonic objective only when said distance is greater than a predetermined distance;
    (c) converting said reflected and transmitted light into an electric signal having a level indicative of the intensity of said reflected and transmitted light; and
    (d) generating an indication when said level of said electric signal falls below a predetermined threshold.

2. A method as claimed n claim 1 further comprising a step before said step (a) of generating light to be reflected in step (a).

3. An ultrasonic imaging system comprising:
    a lens body;
    an ultrasonic objective within said lens body and dimensioned to substantially block the passage of light reflected from the surface of an object to be imaged into said lens body when a distance between said ultrasonic objective and said object surface is less than a predetermined distance, and to permit the passage of said reflected light when said distance is not less than said predetermined distance; and
    means, arranged to receive said reflected light permitted to pass said ultrasonic objective, for generating a signal indicative of the intensity of said received light.

4. An ultrasonic imaging system as claimed in claim 3, in which said lens body further comprises an opaque ring zone arranged on a face of said ultrasonic objective facing said object surface.

5. An ultrasonic imaging system as claimed in claim 3 further comprising a light source arranged to illuminate said object surface for producing said reflected light.

6. An ultrasonic imaging system as claimed in claim 5 wherein said light source is disposed outside of said lens body, and further comprising an optical waveguide for conveying light produced by said light source to said object surface.

7. An ultrasonic imaging system as claimed in claim 5, wheein said light source is disposed in said lens body.

8. An ultrasonic imaging system as claimed in claim 7, further comprising an optical waveguide for conveying light produced by said light source to said object surface.

* * * * *